No. 611,415. Patented Sept. 27, 1898.
W. W. OGDEN.
WHEEL TIRE.
(Application filed Oct. 9, 1897.)
(No Model.)
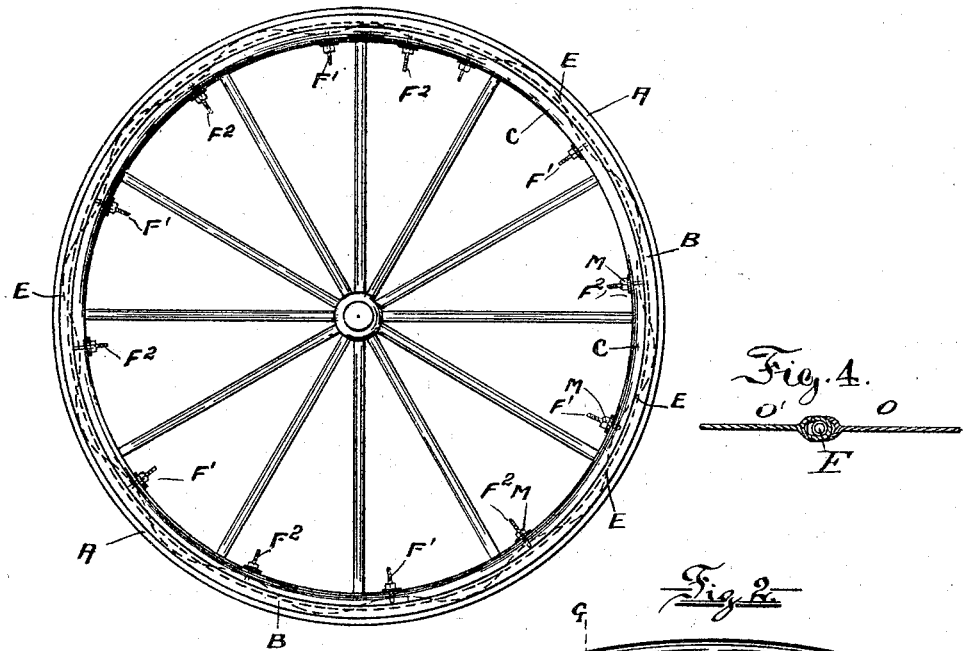
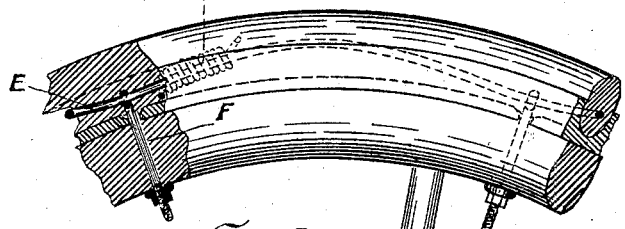
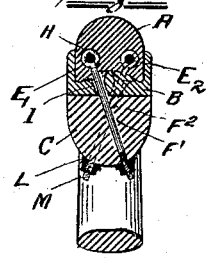

UNITED STATES PATENT OFFICE.

WILLIAM W. OGDEN, OF CHATHAM, NEW JERSEY.

WHEEL-TIRE.

SPECIFICATION forming part of Letters Patent No. 611,415, dated September 27, 1898.

Application filed October 9, 1897. Serial No. 654,645. (No model.)

*To all whom it may concern:*

Be it known that I, WILLIAM W. OGDEN, a citizen of the United States, residing at Chatham, in the county of Morris and State of New Jersey, have invented certain new and useful Improvements in Wheel-Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The herein-described invention relates to certain mechanical means invented by me for the purpose of securing a solid or inflated rubber tire to the wheels of any kind of vehicle; and the object of my inventive idea has been to make those aforesaid means of such a character that they will bind the tire so securely and closely to the wheel-rim as to preserve the tire for a reasonable period of wear. My idea was conceived by having my attention directed to the damaged tires returned to our own carriage-factory, as well as to other factories, showing that on account of the looseness in the adjustment of the rubber tire to the wheel-rim, or, more properly speaking, to the flange-tire that is intermediate between the wheel-rim proper and the rubber tire, the wires or wire that pass through the middle or nether part of the tire worked their way or forced themselves out through the sides of the tire, resulting, of course, in the cutting of the tire. Another disadvantage in the old mode of attachment was what is technically known as the "crawling" of the tire. That means the circumferential displacement from time to time of the tire, plainly observed by simply making a mark on both tire and rim opposite to each other and finding that in a few days the tire would often have traveled so far around on the rim as to nearly have reached the point marked on the rim where it started. That this displacement is naturally caused by the weight sustained by such vehicle is apparent; but even in lighter vehicles such a crawling of the tire is frequently noticeable, with the above-stated disastrous results.

In describing my improved means I shall call attention to the accompanying drawings, where like letters of reference indicate corresponding parts in the different views.

Figure 1 shows a wheel having the tire attached by my improved means; Fig. 2, an enlarged view of part of Fig. 1, broken off to show the individual elements more clearly and their effect on the tire; Fig. 3, a view in cross-section of the wheel-rim, flange-tire, rubber tire, and wires, and a wire lock-bolt (shown in full) and lock-bolt for locking the tire when two wires are used; and Fig. 4, one method of joining the wire ends together at the joint where the ends of the rubber tire meet and are connected together.

In Fig. 3, A indicates a cross-section of my improved rubber tire having the bottom surface concave arc-shaped, so as to conform to the similarly convex arc-shaped surface of the flange-tire B. C is the rim of the wheel. $E'$ and $E^2$ are the wires passing through the rubber tires, respectively on the right and left sides thereof. The said wires can be protected, if it is found desirable, by having a spring G coiled around them throughout the whole circumference, part of which coil G is shown in Fig. 2, which apart from preventing the cutting of the rubber tire in case the wires are single-stranded, as shown in Fig. 2, would have the additional effect of giving more elasticity or spring to the rubber tire. Attached to the wire $E'$ are a series of eyebolts $F'$, having an eye I, through which the wire passes, which secures the left side of the rubber tire to the right side of the wheel-rim, said bolts attached in the customary manner by nuts M, having the disk L lying intermediate the nuts and the felly C. In like manner the eyebolts $F^2$ secure the right side of the rubber tire to the left side of the wheel-rim by having the wire $E^2$, passing through their respective eyes, tightened, as before stated, by nuts and disks to the under side of the felly C. These bolts $F'$ and $F^2$ alternate with each other throughout the whole circumference, as illustrated in Fig. 1, and where the rubber-tire ends are joined together the wire may be connected, as shown in Fig. 4, by having loops O and $O'$ formed, through which loops either of the bolts $F'$ and $F^2$ are passed and then tightened.

Having thus described my invention, what I claim, and desire to secure by Letters Patent, is—

In the manufacture of vehicle-wheels, the combination of a pair of continuous circumferential, single or multistranded wires passing through a solid rubber tire, the channel-formed rim having a convex bottom, the rubber tire having a concave surface fitting the said convex rim-bottom, crosswise right and left directed eyebolts with nuts attached alternating with each other securing said tire and rim to the felly, substantially as illustrated and described, for the purposes set forth.

In testimony that I claim the foregoing I have hereunto set my hand this 1st day of October, 1897.

WILLIAM W. OGDEN.

Witnesses:
AUGUST M. TRESCHOW,
AXEL V. BEEKEN.